United States Patent [19]
Haas

[11] 3,800,023
[45] Mar. 26, 1974

[54] LOADING A CATION EXCHANGE RESIN WITH URANYL IONS

[75] Inventor: Paul A. Haas, Knoxville, Tenn.

[73] Assignee: The United States of America as represented by the United States Atomic Energy Commission, Washington, D.C.

[22] Filed: May 16, 1972

[21] Appl. No.: 253,731

[52] U.S. Cl............ 423/7, 252/301.1 R, 423/256, 423/261
[51] Int. Cl............................................. C01g 56/00
[58] Field of Search.......... 252/301.1 R; 423/7, 256, 423/261; 264/.5

[56] References Cited
UNITED STATES PATENTS

| | | | |
|---|---|---|---|
| 3,438,749 | 4/1969 | Lonadier et al. | 264/.5 |
| 3,401,122 | 9/1968 | Cogliati | 252/301.1 S |
| 3,403,008 | 9/1968 | Hamling | 264/.5 |
| 3,385,915 | 5/1968 | Hamling | 264/.5 |
| 3,334,050 | 8/1967 | Grotenhuis | 252/301.1 R |
| 3,434,809 | 3/1969 | Swanson | 423/7 |
| 3,673,101 | 6/1972 | McKenney | 264/.5 |

Primary Examiner—Leland A. Sebastian
Assistant Examiner—E. A. Miller
Attorney, Agent, or Firm—John A. Horan; Roland A. Anderson; John Hardaway

[57] ABSTRACT

A method for loading ion exchange resins is described. The process comprises contacting a cation exchange resin with a uranyl nitrate salt solution which is acid deficient.

6 Claims, No Drawings

3,800,023

LOADING A CATION EXCHANGE RESIN WITH URANYL IONS

BACKGROUND OF THE INVENTION

This invention was made in the course of, or under, a contract with the U.S. Atomic Energy Commission. It relates generally to a method for loading cation exchange resins with uranyl ions from an acid deficient solution of uranyl nitrate.

Cation exchange resins have been used in the past for producing nuclear fuels. One such method is described by Lonadier et al. in U.S. Pat. No. 3,438,749. Another method is described in U.S. Patent application Ser. No. 48,579, filed May 25, 1970, commonly assigned herewith and now abandoned. The commonly assigned application describes a process whereby cation exchange resins are loaded with U, Pu or Th ions. Subsequent heat treatment of the loaded resin produces a microsphere of either the carbide or oxide of the loaded cation. Such microspheres are useful as nuclear fuels.

Microspheres intended for use as a nuclear fuel must conform to very strict quality requirements. The completed carbonized microspheres must be uniformly spherical such that 99 percent of the spheres have a major to minor axis ratio of less than or equal to 1.2. Ninety-nine percent of the microspheres must also be crack free with no internal voids in excess of 0.1 micron and have diameters within ±10 percent of the mean diameter. The resin microspheres should also be loaded to high uranium contents as the nuclear fuel has minimum concentration limits. A loading at 1.8 milliequivalents of uranium can be used but higher loadings are preferred.

Resins used in the above processes are normally loaded by contacting the resin with a salt solution of the metal to be loaded. Solutions of, for example, $UO_2(NO_3)_2$ or $UO_2F_2$ have been used for loading resin with uranyl ions. Salt solutions have been used both in column and batch operations. A problem resulting from the column operation is that the resin at the top of the column sees a solution of different concentration from that at the bottom of the column, thus resulting in non-uniform loading of the resin. A similar phenomenon is observed when loading in a batch process in that the concentration of the ionic loading specie varies with time. In either case, the concentration of hydrogen ions or the other cations released by the loading of the resin increases with time and hinders full loading of the resin or complete removal of the loading specie. In other words, accumulation of products of the loading reaction stop the reaction before either the resin is completely loaded or the solution is depleted of the loading specie.

Two common types of cation exchange resins used in the above prior art process are strong acid and weak acid. The most prevalent strong acid resins are composed of a sulfonated copolymer of styrene and divinyl benzene. The percentage of divinyl benzene is referred to as the percent crosslinkage since the divinyl benzene forms the third dimension of the copolymer. The functional-sulfonic group ($SO_3^-$) is attached to either a sodium or hydrogen ion which will exchange with the cation to be loaded. While the strong acid resins have many desirable characteristics, the presence of the sulfur is undesirable because it is retained as an impurity in the completed fuel. Sulfur, if present during fuel processing and reactor operation, causes corrosion of equipment as well as necessitating steps to prevent release to the atmosphere.

Weak acid resins have a carboxylic acid functional group attached to a copolymer of either methacrylic or acrylic acid crosslinked with divinyl benzene. The degree of crosslinking can be characterized by specifying the moisture content of the resin, since the moisture content is inversely proportional to the degree of crosslinkage. Weak acid resins are more desirable for use in making nuclear fuels because they have no residual sulfur and have a higher theoretical loading capacity than the strong acid resins. However, strong acid resins are normally used in prior art processes because, prior to this invention, weak acid resins have been loaded with uranyl ions to only a fraction of their theoretical capacity. The loading time for weak acid resins using prior art processes has also been much longer than that required for strong acid resins. Even if the long loading times were used many of the weak acid resin particles would crack so as to lose their sphericity during loading.

SUMMARY OF THE INVENTION

It is thus an object of this invention to provide a process for efficiently and uniformly loading ion exchange resins.

It is a further object of this invention to achieve higher loadings than those obtained with the salt solutions of the prior art.

It is a particular object of this invention to provide a process for satisfactorily loading uranyl ions onto weak acid resins.

These and other objects are accomplished by a process wherein an acid deficient solution of uranyl nitrate having a molar ratio of $[UO_2^{++}]$ to $[NO_3^+]$ of greater than 0.5 is used as a transfer medium for loading cations onto an ion exchange resin.

DETAILED DESCRIPTION

According to this invention it has been found that uranyl ions can be loaded onto all cation exchange resins by using an acid deficient solution of uranyl nitrate. As used within this disclosure the term "acid deficient" means that the concentration ratio of cations to anions is greater than the stoichiometric ratio. The greater than stoichiometric cation concentration forces a decrease in the hydrogen ion concentration, and thus the term acid deficient is used.

Acid deficient solutions of uranyl nitrate have been found to produce superior results in loading both strong and weak acid resins. However, surprisingly superior results have been obtained when loading acrylic divinyl benzene resins with a moisture content of from 71 to 73 wt. %.

The preferred particle size of resin microspheres for use in the invention is from 0.3 to 0.8 mm diameter. It is, of course, understood that this invention is not limited to a process of producing nuclear fuel but may be used to load resin particles of any size and shape.

Acid deficient solutions of uranyl nitrate for use in this invention are preferably prepared by reacting $UO_3$ powder with a 0.1 to 2.0 molar aqueous solution of nitric acid. The $UO_3$ is added while heating and stirring at 80°C until saturation is achieved and a substantial excess of $UO_3$ powder is observed. Preferably about 58 grams of $UO_3$ are added per liter of 0.3 molar nitric acid to prepare an acid deficient solution suitable for initially contacting an ion exchange resin. A liter of this solution is suitable for loading about 130 milliequivalents of resin without adding additional $UO_3$. Optionally excess $UO_3$ can be added to a 0.5 to 1 molar aqueous solution of uranyl nitrate to produce an acid deficient solution.

In the above preparation process $UO_3$ reacts with $HNO_3$ to form $UO_2(NO_3)_2$ and $H_2O$. Additional $UO_3$ is dissolved by the $UO_2(NO_3)_2$ to the extent of about 15 grams per liter at 80°C. The additionally dissolved $UO_3$ causes the solution to be acid deficient. A discussion of the term "acid deficient" can be found in U.S. Pat. No. 3,049,400.

The kinetics of the loading process are temperature and pH dependent. Strong acid resins load well at a pH of above 0.5 and preferably about 2.5. Weak acid resins load best at a pH of from 2.8 to 3.4 and preferably at about 3. The pH of the acid deficient solution depends on the rate of $H^+$ production by the resin loading reaction and the $H^+$ depletion by reaction with $UO_3$.

The final pH when equilibrium is approached is that of solution in equilibrium with $UO_3$ if there is an excess of $UO_3$ or solution in equilibrium with partially loaded resin if there is an excess of resin. The cation exchange resins will load at a temperature of from about 20° to 100°C, but optimally at temperature of from about 50° to 85°C.

Resins may be loaded using the process of this invention by either a batch or column operation. In a column operation the acid deficient solution is flowed through the column and the effluent from the column, now containing some $HNO_3$, is circulated to a mixer where additional $UO_3$ is added to again achieve an acid deficient state. The replenished acid deficient solution is recirculated from the mixer to the column. A column operation may also be used wherein an excess $UO_3$ powder is present in the acid deficient influent solution. As uranyl ions are taken into the ion exchange resins, the excess $UO_3$ powder replenishes the acid deficient solution such that $HNO_3$ does not accumulate in the solution. This insures that all resin particles will be uniformly loaded. The effluent from the column can be mixed with additional $UO_3$ powder and used again.

As a further modification, the column may be the semi-continuous type of ion exchange contactor as is described in U.S. Pat. No. 2,815,322 to Higgins. The resin is hydraulically moved to add fresh resin at one end of the column and discharge loaded resin at the other end. The effluent from the column is retained to a mixer where $UO_3$ is added as described above.

Batch processes may also be used in carrying out the process of this invention. In a batch process, the resin along with the acid deficient solution is stirred while heating. During the course of the process additional $UO_3$ powder is added so as to maintain the acid deficient state. After loading is completed the solution may be reused with another batch.

EXAMPLE I

Ion exchange resins characterized as follows were used in this experiment.

TABLE I

| Resin | Acid type | Functional group | Copolymer | Moisture content (percent) | Exchange capacity ($H^+$ form) (meq/ml) |
|---|---|---|---|---|---|
| Dowex 50W-X8[1] | Strong | $-SO^-$ | styrene divinyl benzene | 45–53 | 1.88 |
| Amberlite IR-120[2] | do | $-SO_3^-$ | do | 44–48 | 1.9 |
| Duolite C-25[3] | do | $-SO_3^-$ | polystyrene | 55–60 | 1.5 |
| Amberlite IRC-72[2] | Weak | $-COO^-$ | acrylic divinyl benzene | 71–73 | 3.3 |
| Relite CC[4] | do | $-COO^-$ | do | 46–53 | 3.3 |
| Amberlite IRC-50[2] | do | $-COO^-$ | methacrylic divinyl benzene | 43–53 | 3.5 |
| Amberlite IRC-84[2] | do | $-COO^-$ | acrylic divinyl benzene | 43–50 | 3.5 |
| Duolite CC-3[3] | do | $-COO^-$ | polyacrylic | 48–53 | 3.5 |

[1] Dow Chemical Company.
[2] Rohm and Haas Company.
[3] Diamond Shamrock Chemical Company.
[4] Sybron Corporation.

Some of the above resins are available only in the sodium form. These resins must be changed to the hydrogen form prior to loading with uranyl ions. This is down by conversion with an acid followed by washing with water. For example, Amberlite IRC-72 was mixed with 1.5 M $HNO_3$ until the pH was less than 0.5 and then washed with water until the pH was above 3.5.

Each of the resins was tested in a batch operation using measured amounts of resin, $UO_3$, uranyl nitrate solution, and nitric acid in agitated vessels. Tests with up to 200 ml of resin were made in glass beakers of 250 to 600 ml volume using a combination magnetic stirrer-hot plate. Larger quantities of resin (up to 2,000 ml) were tested using motor driven paddle or propeller agitators in glass beakers of 1, 2, or 4 liter volume modified to provide three or four vertical baffles for mixing. Heated resin samples were dried overnight by drawing laboratory air through the resin on a coarse porosity, fritted-glass filter or a screen. Solution pH values were determined using a standard laboratory pH meter with an all purpose electrode calibrated with a pH = 2.0 buffer. The results are tabulated in Table II below.

TABLE II

| Resin | Feed Resin (ml) | Feed $UO_2^{++}$ (meq/ml) resin | Feed $NO_3^-$ (meq/ml) resin | Final solution $NO_3^-$ normal | Final solution pH | U loaded (meq/ml) | Load time (hrs.) | Temp. (°C) |
|---|---|---|---|---|---|---|---|---|
| Dowex 50W-X8 | 40 | 2.16 | 0.19 | 0.13 | 2.17 | 2.0 | 0.25 | 70 |
| | 50 | 6.43 | 4.05 | 2.0 | 1.76 | 2.04 | 1.9 | 70 |
| | 100 | 3.22 | 0.67 | 0.5 | 3.20 | 2.45 | 29 | 65 |
| | 1,400 | 2.25 | .20 | .24 | 2.5 | 2.03 | 1.5 | 70 |
| | 6,000 | 2.80 | .60 | .23 | 2.95 | 2.02 | 2 | 56 |
| Amberlite IR-120 | 49 | 9.70 | 7.45 | 3.6 | 1.1 | 1.88 | 1.7 | 65 |
| | 62 | 7.6 | 7.45 | 2.5 | 0.40 | 1.76 | 0.6 | 64 |
| | 62 | 5.26 | 4.14 | 2.3 | 1.3 | 1.8 | 3.9 | 65 |
| Duolite C-25 | 295 | 1.88 | 0.40 | 0.30 | 2.8 | 1.45 | 4.5 | 85 |
| Amberlite IRC-72 | 50 | 4.12 | .84 | .4 | 2.8 | 3.1 | 1.5 | 65 |
| | 100 | 4.32 | .60 | .4 | 3.16 | 3.5 | 28 | 55-65 |
| | 106 | 4.19 | .72 | .5 | 2.9 | 3.3 | 2.0 | 68 |
| | 243 | 3.51 | .31 | .23 | 3.1 | 3.20 | 1.5 | 77 |
| | 288 | 3.48 | .32 | .30 | 2.8 | 3.14 | 1.0 | 70 |
| | 400 | 3.72 | .35 | .4 | 2.73 | 3.33 | 4.3 | 77 |
| | 600 | 3.6 | .3 | .3 | 3.05 | 3.1 | 3 | 65 |
| | 2,000 | 4.80 | 1.40 | .3 | 3.0 | 3.1 | 5 | 50 |
| | 6,000 | 3.9 | 0.60 | .23 | 3.3 | 3.2 | 5 | 50 |
| Relite CC | 101 | 3.16 | .26 | .13 | 3.3 | 2.85 | 6 | 75 |
| | 605 | 2.77 | .15 | .2 | 2.63 | 2.60 | 5.2 | 75 |
| Amberlite IRC-50 | 49 | 7.60 | 4.17 | 2.3 | 2.0 | 3.20 | 3.1 | 60-80 |
| | 49 | 10.8 | 7.60 | 3.4 | 1.6 | 2.6 | 3.6 | 65 |
| | 49 | 5.10 | 2.04 | 1.0 | 2.4 | 2.84 | 20 | 75 |
| | 49 | 9.73 | 6.14 | 3.0 | 1.7 | 2.90 | 20 | 75 |
| Amberlite IRC-84 | 50 | 6.50 | 5.00 | 0.7 | 2.6 | 1.1 | 24 | 47-67 |
| | 50 | 2.72 | 0.76 | .35 | 2.9 | 1.9 | 66 | 88 |
| | 51 | 5.72 | 4.58 | 2.9 | 2.0 | < 0.6 | 48 | 65 |
| | 52 | 3.62 | 1.87 | 1.0 | 2.9 | 1.6 | 58 | 90 |
| | 99 | 3.30 | 0.81 | 0.5 | 3.3 | 2.1 | 70 | 85 |
| Duolite CC-3 | 50 | 3.42 | .78 | .3 | 2.9 | < 2.0 | 72 | 85 |

Some of the resin samples were carbonized by the technique described in S. N. 48,579 to determine the ultimate uranium density which could be achieved by the process of this invention. The results are tabulated in Table III below.

TABLE III

| Resin | Uranium Concentration Meq/ml Wet Resin | Wt. % Dried at 25°C | Wt. % Carbonized |
|---|---|---|---|
| Dowex 50W-X8 | 2.0 | 31 | — |
| Amberlite IR-120 | 1.88 | 29.7 | 49.1 |
| Amberlite IRC-50 | 3.2 | 37.0 | 67.9 |
| Amberlite IRC-84 | 2 | 27.7 | 60.7 |
| Amberlite IRC-72 | 3.2 | 43.3 | 67.4 |

The strong acid resins all loaded well with Dowex 50W-X8 being superior to the other strong acid resins in the following respects: amount of cracking, amount of voids, amount of non-spherical particles and capacity per unit volume.

Amberlite IRC-72 was surprisingly superior to all other weak acid resins. It is also superior to the strong acid resins in that there is no residual sulfur and in the higher uranium loadings. Many of the other weak acid resins were irregular in shape with few perfect spheres. Other weak acid resins also showed excessive cracking during loading. The resins which did not show the above adverse properties required prohibitively long periods of time for loading. The superior properties exhibited by Amberlite IRC-72 are not entirely understood but are perhaps attributed to its high moisture content, i.e., low degree of crosslinkage. Other experiments revealed that the superior properties of this resin are irreversibly destroyed by drying it prior to loading.

EXAMPLE II

The following were combined in a 250 ml beaker and warmed to 70°C with stirring:

8 meq uranyl nitrate
77 meq $UO_3$ (based on 2 eq/mole)
39.5 cc Dowex 50W-X8 resin
$H_2O$ to give 70 cc total volume Within 15 minutes after mixing, the solution was clear, free of $UO_3$ slurry, and had a pH = 2.2. This shows complete loading of a strong acid resin in 15 minutes leaving only uranium solution which could be used to load the next batch by adding only $UO_3$, without any additional uranyl nitrate.

EXAMPLE III

The following were combined in a 4-liter baffled beaker and warmed to 46°C with stirring.

150 meq uranyl nitrate
3,920 meq $UO_3$ (based on 2 eq/mole)
1,960 cc Dowex 50W-X8 resin
$H_2O$ to give about 2.8 liter total volume After 1 hour, the solution was clear, free of $UO_3$ slurry, and had a pH = 1.7. This procedure with agitation promotes rapid and uniform loading of the resin. There is no need to monitor flow rates or concentrations, since selected amounts of $UO_3$, resin, and solutions are mixed to give the desired final concentrations at equilibrium. Uniform partial loadings are possible if desired while fixed-bed loadings can only approximate uniformity by continuing solution flow until the exit concentration approaches the inlet concentration (that is, the resin is in equilbrium with the feed).

EXAMPLE IV

The following were combined in a 600 ml baffled beaker and warmed to 70°C with stirring.

288 ml or 910 meq Amberlite IRC-72 resin in the H form
144.2 g or 1,013 meq $UO_3$ (93% $^{235}U$)

93 meq $HNO_3$ $H_2O$ to make about 400 ml total volume

After 1 hour at 70°C, the $UO_3$ was all dissolved and the solution pH was 2.8. The loaded resin was filtered and dried at room temperature to give the following:
106 meq of U in solution
907 meq of U on resin (by difference) or 100% loading
245.5 g of loaded resin of 43.5 wt. % U.

EXAMPLE V

One hundred and six cc (350 meq) of Amberlite IRC-72 was warmed in water to 70°C. To this was added 365 meq U as $UO_3$ and 78 meq U as uranyl nitrate. After one hour at 70°C, the solution was slightly hazy and pH was 2.55, indicating full loading of the resin. Final pH at 25°C was 2.9. The resin was washed and air dried to give 94.7 g of dried resin of 43.3 wt. % U.

In general, the carboxylic acid cation resins require acid-deficient uranyl nitrate solutions ($NO_3^-$/U mole ratios of less than 2.0) before useful uranium loadings are possible.

EXAMPLE VI pH measurements were made for loading 100 ml of Amberlite IRC-72 resin using solution which was 0.3 N $NO_3^-$ (60 meq $NO_3^-$, about 200 ml solution).
Stoichiometric uranyl nitrate, no resin, pH = 2.45
After resin addition (60 meq U) pH = 1.11
After 14.5 g $UO_3$ addition, equilibrium pH = 1.45
After 29.3 g $UO_3$ addition, equilibrium pH = 2.32
After 36.25 g $UO_3$ addition, equilibrium pH = 2.68
After 43.75 g $UO_3$ addition, equilibrium pH = 2.82

The amount of U added along with the $NO_3^-$/U ratios as a function of pH was used to calculate the U loadings. This test and other results show that steady state pH values are reached in 2 hours or less at 50° to 80°C.

The dissolution of $UO_3$ slows down for pH >2.8 and the loading slows down for loadings of 3 meq/ml or higher.

What is claimed is:

1. A method for loading a weak acid cation exchange resin with uranyl ions, comprising the steps of:
preparing an acid deficient solution of $UO_3$ and uranyl nitrate such that the ratio of [$UO_2^{++}$] to [$NO_3^-$] in said solution is greater than 0.5;
contacting said resin with said solution, said weak acid resin being an acrylic acid divinyl benzene copolymer having a carboxylic acid functional group and a moisture content of 71 to 73 wt. %, at a temperature of about 20° to 100°C, thus causing hydrogen ions in said resin to exchange with said [$UO_2^{++}$] ions of said solution;
replenishing said [$UO_2^{++}$] ions lost from said solution so as to maintain said ratio and said acid deficient state during said step of contacting; and
removing the resulting loaded resin from said solution.

2. The method according to claim 1 wherein said temperature is from about 50° to 85°C.

3. The method according to claim 1 wherein said uranyl nitrate solution is a 0.05 to 1 molar aqueous solution.

4. The method according to claim 1 wherein said step of replenishing comprises adding additional $UO_3$ powder to said uranyl nitrate solution after said step of contacting.

5. The method according to claim 1 wherein said step of replenishing comprises the steps of providing additional undissolved $UO_3$ within said solution so as to maintain saturation.

6. The method according to claim 1 wherein said step of replenishing comprises the step of circulating said solution to a container of $UO_3$ to dissolve replenishing amounts thereof before returning said solution to said step of contacting.

* * * * *